(12) United States Patent
Wood et al.

(10) Patent No.: US 9,798,620 B2
(45) Date of Patent: Oct. 24, 2017

(54) SYSTEMS AND METHODS FOR NON-BLOCKING SOLID-STATE MEMORY

(71) Applicant: SanDisk Technologies LLC, Plano, TX (US)

(72) Inventors: Robert Wood, Niwot, CO (US); Jeremy Fillingim, Salt Lake City, UT (US); Pankaj Mehra, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/449,787

(22) Filed: Aug. 1, 2014

(65) Prior Publication Data

US 2015/0220385 A1    Aug. 6, 2015

Related U.S. Application Data

(60) Provisional application No. 61/936,676, filed on Feb. 6, 2014.

(51) Int. Cl.
*G06F 3/06*     (2006.01)
*G06F 11/10*    (2006.01)
*G06F 12/02*    (2006.01)

(52) U.S. Cl.
CPC ............ *G06F 11/108* (2013.01); *G06F 3/061* (2013.01); *G06F 3/0613* (2013.01); *G06F 12/0246* (2013.01); *G06F 3/0601* (2013.01); *G06F 3/0652* (2013.01); *G06F 2201/85* (2013.01); *G06F 2212/1032* (2013.01); *G06F 2212/7201* (2013.01); *G06F 2212/7208* (2013.01)

(58) Field of Classification Search
CPC .. H04L 1/0045; H04L 1/0036; G06F 11/1076; G06F 11/1004; G06F 3/0689; G06F 11/108; G06F 3/061; G06F 3/0652; G06F 3/0601; G06F 3/0613; G06F 2212/2022; G06F 2212/7201
See application file for complete search history.

(56) References Cited

U.S. PATENT DOCUMENTS

| | | | |
|---|---|---|---|
| 5,548,711 | A | 8/1996 | Brant et al. |
| 5,617,530 | A | 4/1997 | Stallmo et al. |
| 5,642,494 | A | 6/1997 | Wang et al. |
| 5,911,779 | A | 6/1999 | Stallmo et al. |
| 6,070,262 | A | 5/2000 | Kellogg et al. |

(Continued)

*Primary Examiner* — Joseph Schell
(74) *Attorney, Agent, or Firm* — Stoel Rives LLP

(57) ABSTRACT

Techniques are disclosed relating to writing data across multiple storage blocks in a storage device. In one embodiment, physical erase blocks in a bank of a storage device are erasable. Ones of the physical erase blocks may be associated with different respective communication channels. In such an embodiment, a data stripe may be written across a set of physical erase blocks such that the set of physical erase blocks includes physical erase blocks of different banks and includes physical erase blocks associated with different communication channels. In some embodiments, a request to read a portion of the data stripe may be received. In response to the request, a determination may be made that one of the set of physical erase blocks is unavailable to service the request. The request may then be serviced by reassembling data of the unavailable physical erase block.

20 Claims, 7 Drawing Sheets

(56) References Cited

U.S. PATENT DOCUMENTS

| | | | |
|---|---|---|---|
| 6,357,030 B1 | 3/2002 | Demura et al. | |
| 6,973,604 B2 | 12/2005 | Davis et al. | |
| 7,296,209 B2 | 11/2007 | Katayama et al. | |
| 7,428,691 B2 | 9/2008 | Ouchi | |
| 7,574,554 B2 | 8/2009 | Tanaka et al. | |
| 7,774,684 B2 | 8/2010 | Bains | |
| 7,797,503 B2 | 9/2010 | Bellofatto et al. | |
| 7,822,887 B2 * | 10/2010 | Torabi | G06F 12/0207 710/29 |
| 7,823,044 B2 | 10/2010 | Simon | |
| 7,865,809 B1 | 1/2011 | Lee et al. | |
| 7,958,280 B2 | 6/2011 | Salessi et al. | |
| 7,966,550 B2 | 6/2011 | Mokhlesi et al. | |
| 7,975,209 B2 | 7/2011 | Chin et al. | |
| 8,019,938 B2 | 9/2011 | Flynn et al. | |
| 8,019,940 B2 | 9/2011 | Flynn et al. | |
| 8,074,021 B1 * | 12/2011 | Miller | G06F 11/108 710/22 |
| 8,151,173 B2 | 4/2012 | Hirose et al. | |
| 8,181,089 B1 * | 5/2012 | Fernandes | G06F 11/1076 714/25 |
| 8,195,978 B2 | 6/2012 | Flynn et al. | |
| 8,301,832 B1 | 10/2012 | Moore et al. | |
| 9,632,870 B2 * | 4/2017 | Bennett | G06F 11/108 |
| 2008/0250270 A1 * | 10/2008 | Bennett | G06F 11/1068 714/6.13 |
| 2009/0164836 A1 | 6/2009 | Carmichael | |
| 2012/0131413 A1 | 5/2012 | Thatcher et al. | |
| 2012/0304039 A1 | 11/2012 | Peterson et al. | |
| 2013/0019057 A1 * | 1/2013 | Stephens | G06F 11/108 711/103 |
| 2013/0290611 A1 * | 10/2013 | Biederman | G11C 16/30 711/103 |
| 2014/0268402 A1 * | 9/2014 | McCabe | G11B 19/209 360/73.02 |

* cited by examiner

SYSTEMS AND METHODS FOR NON-BLOCKING SOLID-STATE MEMORY

The present application claims the benefit of U.S. Provisional Appl. No. 61/936,676 filed on Feb. 6, 2014, which is incorporated by reference herein in its entirety.

BACKGROUND

Technical Field

This disclosure relates generally to storing data on a physical recording medium, and more specifically to storing data in a manner that facilitates improved access to the data.

Description of the Related Art

Various encoding schemes have been developed for detecting data corruption and/or facilitating data recovery. Such schemes may use error-detecting codes computed from the data (such as checksums, cyclic redundancy check (CRC) codes, hash values, parity bits, etc.) in order to determine whether the data has changed while being stored. Still further, such schemes may use data stored redundantly or use error-correcting codes (such as Hamming codes, Reed-Muller codes, etc.) to recover data if it becomes corrupted.

Within the context of data storage, redundant array of independent disks (RAID) schemes are, perhaps, the most prevalent. Depending on the particular implementation, a RAID may employ data redundancy as well as encoded information to facilitate recovering from a disk failure. For example, in RAID 1, data may be mirrored between two or more storage devices, so that data can still be recovered if one of the devices fails. In other implementations, such as RAID 3-5, data is written across multiple storage devices along with parity information computed from the data. If a drive failure occurs, an exclusive-or operation may be performed between the parity information and the remaining data to recover data from the failed drive.

SUMMARY

In one embodiment, an apparatus is disclosed that includes an erase module and a write module. The erase module is configured to erase a plurality of physical erase blocks in a bank of a storage device. In such an embodiment, ones of the plurality of physical erase blocks are associated with different respective communication channels. The write module is configured to write a data stripe across a set of physical erase blocks. The set of physical erase blocks includes physical erase blocks of different banks and includes physical erase blocks associated with different communication channels.

In another embodiment, a storage device is disclosed that includes a solid-state storage array having storage blocks divided into groups. The storage device is configured to reclaim storage blocks within a given one of the groups concurrently. Storage blocks within the given group are accessible via separate respective communication channels. The storage device is configured to write a data stripe that spans multiple ones of the groups and spans storage blocks accessible via multiple ones of the communication channels.

In yet another embodiment, a method is disclosed. The method includes receiving a request to store data on a storage device having storage elements arranged into rows and columns. The storage device is configured to erase storage elements within a given row such that erasures of the storage elements overlap at least in part in time, and to access storage elements within separate columns in parallel. The method further includes writing a set of data diagonally across a plurality of the rows and a plurality of the columns such that a portion of the set of data is recoverable when a storage element at one of the plurality of rows and one of the plurality of columns is inaccessible.

Figure 1:
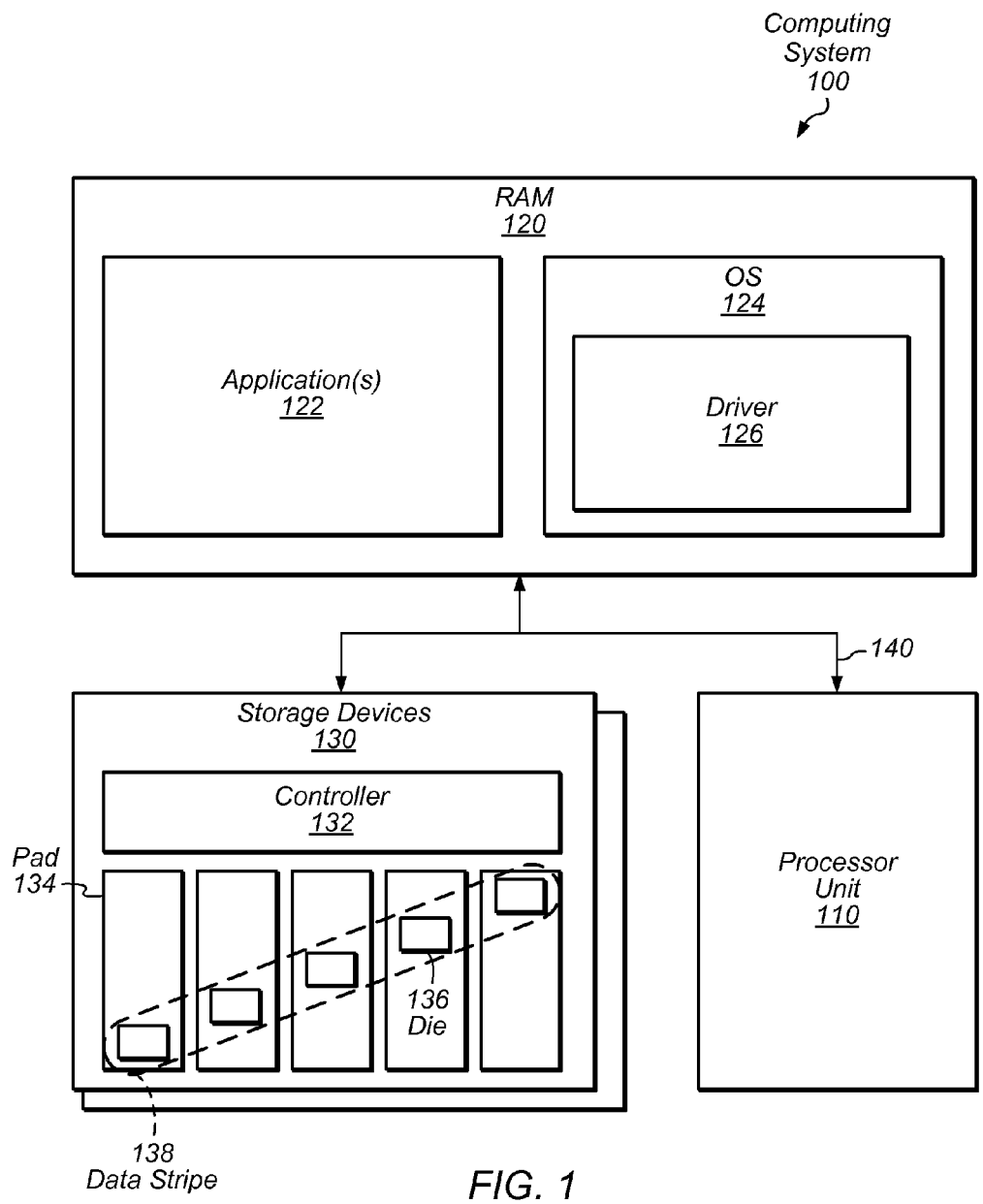
FIG. 1 is a block diagram illustrating one embodiment of a computing system that implements a non-blocking storage scheme.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. §112, sixth paragraph, for that unit/circuit/component.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various forms of non-volatile memory, such as flash memory, may perform various operations in order to maintain data, such as read operations, program operations, and erase operations. In some forms of memory, these operations have significantly different execution times, which may differ by orders of magnitude. Still further, these operations may be performed on groups of storage elements that differ in size—e.g., an erase operation may be performed on a group of storage elements capable of storing 40 MB of data while a program operation may be performed on a group of storage elements capable of storing 8 kB of data. These differences in execution times and group sizes can hinder storage device performance since lower-latency operations (e.g., read operations) may be held up (i.e., blocked by) higher-latency operations (e.g., erase operations).

The present disclosure describes embodiments of a storage scheme in which data is stored as a data stripe across multiple storage elements in order to improve data access times. As used herein, the term "data stripe" refers to storing data across multiple storage elements with metadata that is usable to reassemble at least a portion of the data. The term "striping" refers to the writing of data as a data stripe. As used herein, the term "reassembling" generally refers to the application of a mathematical formula to a set of data in order to reproduce data. For example, if a portion of a data stripe is missing, an exclusive-or operation may be performed between the remaining portion of the data stripe and parity bits generated from the data stripe in order reproduce the missing data. The terms "recovering," "recreating," etc. may also be used herein to describe reassembling data. As will be described below, in various embodiments, various storage operations may be tracked in order to determine whether storage elements are available or unavailable for current use. (As used herein, the term "unavailable" is used to describe a storage element that is unable to perform a task. A storage element may be temporarily unavailable. For example, a storage element may be occupied performing a task (e.g., reading data, writing data, etc.) and, thus, is presently unable to take on an additional task. As another example, a storage element may also be temporarily unavailable because it is has been temporarily taken out of service (e.g., temporarily retired). A storage element may also be permanently unavailable—e.g., due to a physical failure of the storage element.) In such an embodiment, if a read operation is to be performed on a storage element that is currently unavailable, data of the storage element may be reassembled from other storage elements by using the data stripe's additional metadata. In other words, rather than delaying the read operation (i.e., allowing the read operation to block), data of the unavailable storage element can be obtained while the storage element is being used for some other operation. Such a storage scheme thus trades bandwidth (as additional read operations are performed) for improved latency. As will also be described, in some embodiments, additional performance may be achieved by striping the data in a manner that maximizes bus utilization and by scheduling operations more intelligently. In some embodiments, storing data in the manner described herein may be particularly beneficial for storage systems that employ non-volatile memory having the characteristics discussed above, such as flash media. In other embodiments, the storage scheme may be used with other forms of media, such as those discussed below.

The disclosure initially describes, with reference to FIG. 1, a computing system configured to implement a non-blocking storage scheme. To facilitate this description, a layout of one embodiment of a storage device is discussed with respect to FIG. 2A; a log-based storage is also discussed with respect to FIG. 2B. An embodiment of a "diagonal" data stripe is described with reference to FIG. 3. Other embodiments relating to data striping are described in further detail with reference to FIGS. 4 and 5. An exemplary storage system that includes such a computing system is finally described with reference to FIG. 6.

Turning now to FIG. 1, a block diagram of computing system 100 is depicted. Computing system 100 may be any suitable type of computing device such as a server, laptop, desktop, mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 6. In the illustrated embodiment, computing system 100 includes a processor unit 110, random access memory (RAM) 120, and one or more storage devices 130 coupled together via an interconnect 140. As shown, RAM 120 may include program instructions for one or more applications 122 and an operating system (OS) 124 executable by processor unit 110. OS 124 may include a driver 126 for storage devices 130, which, in turn, may include a controller 132 and one or more storage pads 134.

In various embodiments, driver 126 is described as having various functionality. This functionality may be implemented in software, hardware or a combination thereof. Further, such functionality may be implemented by software outside of OS 124—e.g., as an application 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in software within OS 124 should not be seen as limiting, but rather as a depiction of an exemplary embodiment.

Storage devices 130 are representative of any physical medium upon which data can be accessed. As used herein, the term "accessed" refers broadly to the process of an electronic computing device storing, writing or otherwise transferring one or more data values on to some physical medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to RAM 120) and storage (when referring to a storage device 130) in FIG. 1 and elsewhere in this disclosure may refer to volatile and/or non-volatile media. Such media may also be referred to herein as "memory," and portions of such media may be referred to as "elements," "blocks," "cells," "storage blocks," "memory blocks," etc. Collectively, a group of these blocks may be referred to as a "storage array," "memory array," etc. The term "solid-state storage array," as used herein, refers to a storage array that includes non-volatile solid-state media such as the various forms of media described below.

In some embodiments, storage devices 130 may be implemented such that they include non-volatile memory. Accordingly, in such an embodiment, storage devices may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage devices 130 may be implemented such that they include non-volatile solid-state memory. Accordingly, in such an embodiment, storage devices 130 may include any suitable type of solid-state storage media including, but not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), etc. In some embodiments, storage devices 130 may include multiple, different types of solid-state storage media.

In the illustrated embodiment, recording media within storage devices 130 resides in multiple dies 136 arranged into pads 134. (It is noted that FIG. 1 merely depicts a single die 136 within a given pad 134 to simplify the diagram.) As used herein, the term "pad" refers to a collection of stacked dies. The term "die" has its ordinary and accepted meaning in the art, and refers to an integrated circuit cut from a processed wafer. In some embodiments, each pad 134 may be coupled to controller 132 via a respective communication channel (i.e., via a respective physical bus) such that dies 136 within separate pads 134 are accessible in parallel. In such an embodiment, multiple dies 136 within a given pad 134 are accessed sequentially; in other embodiments, however, dies 136 within a given pad 134 may be accessible in parallel. As will be described with respect to FIG. 2A, in some embodiments, dies 136 within separate pads 134 may be grouped into banks (As used herein, the term "bank" refers to a collection of multiple storage blocks that are collocated and configured such that storage blocks in separate banks are accessible in parallel.) For example, in one embodiment, bank 1 may include dies 136 located at the bottom of pads 134, bank 1 may include dies 136 stacked on top of the dies 136 in bank 2, and so on. It is noted, however, that storage device 130 may be configured differently than shown in other embodiments. For example, storage devices 130 may include more (or less) pads 134 and/or dies 136; storage devices 130 may also not employ pads 134. In other words, the particular layout depicted in FIG. 1 should not be seen as limiting, but rather as a depiction of an exemplary embodiment.

Controller 132, in one embodiment, is configured to manage operation of a storage device 130. Accordingly, controller 132 may facilitate performance of read operations at specified addresses (e.g., "physical addresses" as discussed below) including selecting the appropriate pads 134, and accessing the data within the appropriate dies 136 within those pads 134. Controller 132 may facilitate performance of write operations including programming of particular cells. Controller 132 may also perform preparation operations to permit subsequent writes to a storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), etc. In some embodiments, controller 132 may also perform other operations such as error checking, data compression, encryption and decryption, packet assembly and disassembly, etc.

In various embodiments, a storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to an address range (i.e., a collection of one or more addresses) that can be used to specify data within a storage device. As will be described below, a log-structured storage may have both logical and physical address spaces. The term "logical address space" refers to an address space as perceived by higher-level processes (e.g., applications 122 and OS 124) even though this address space may not be representative of how data is actually organized on the physical media of a storage device 130 or the actual number of physical address locations actually in use, reserved, or allocated to a higher-level process. In contrast, the term "physical address space" refers to the address space used by lower-level processes and may be indicative of how data is organized on the physical media of a storage device 130 and the actual number of physical address locations in use by a higher-level process. One embodiment of a log structure is discussed in conjunction with FIG. 2B.

OS 124, in one embodiment, implements a file system to facilitate the retrieval of data by applications 122. As used herein, the term "application" (or "process") refers generally to a collection of program instructions executable by one or more processors. Examples of applications may include, for example, OS 124, a file system manager, a database management system (DBMS), a user space library, a driver (e.g., driver 126, filter drivers, a redundant array of independent disks (RAID) driver, etc.), etc.

Driver 126, in one embodiment, is executable to permit applications 122 and OS 124 to interact with storage devices 130. Accordingly, driver 126 may receive requests to perform read and write operations at specified logical block addresses and may issue corresponding commands to controller 132 to implement those operations. In some embodiments, driver 126 manages garbage collection for storage devices 130 to reclaim storage blocks with invalid data. As used herein, "reclaiming" a storage block or "reclamation"

of a storage block refers to preparing the storage block for reuse (i.e., so that the storage block can store new data). In the case of flash media, reclamation may include copying valid data out of the storage block and erasing the block. In some embodiments, to facilitate performance of read and write operations, driver 126 also maps logical addresses (e.g., LBAs) to corresponding physical addresses (in other embodiments, mapping logical addresses to physical addresses may be performed elsewhere, such as at controller 132). Accordingly, driver 126 may also manage one or more translation maps including adding and removing translations from the maps as data is manipulated on storage devices 130.

In various embodiments, driver 126 supports writing data as data stripes 138 across multiple storage elements in order to enable portions of the data to be reassembled when one or more of the storage elements are currently unavailable. That is, in one embodiment, driver 126 may implement a K-of-N storage scheme in which K is the number of storage elements that store data of the data stripe 138, N−K is the number of storage elements that store recovery metadata, and N is the total number of storage elements storing the data stripe (i.e., the data and the recovery metadata). Such a scheme may permit the recovery of data even when up to N−K storage elements are unavailable. N−K may be any suitable number—e.g., two or more in some embodiments. Driver 126 may also generate recovery metadata in accordance with any suitable encoding scheme such as generating parity bits, Hamming codes, Reed-Muller codes, etc. Recovery metadata for multiple data stripes may be written to the same storage element such as in accordance with redundant array of independent disks (RAID) 3 and 4, or interspersed with the data across multiple storage elements such as in accordance with RAID 5. The storage elements may correspond to any suitable storage block such as those discussed below with respect to FIG. 2A.

As discussed above, storage elements within storage device 130 may become unavailable when they are busy being used to perform various operations such as, in some embodiments, read operations, write operations, and erase operations. In various embodiments, driver 126 may track operations in order to determine whether storage elements are currently available to service requests to read data from the storage elements. In one embodiment, if driver 126 determines that data for a read request resides in an unavailable storage element, driver 126 may issue requests to the storage elements that include the remaining portions of the data stripe in order to reassemble the requested data. For example, in one embodiment, driver 126 may read the remaining data from K−1 storage elements and perform an exclusive-or operation with parity bits read from another one of the storage elements. The storage scheme described herein may thus be described as a "non-blocking" storage scheme as the read operation for the requested data does not block until the unavailable storage element becomes available. Such a scheme also stands in contrast to prior storage schemes that solely use data striping to recover data in the event of a storage device failure.

In various embodiments, driver 126 selects storage elements for striping data in order to minimize the number of storage elements that are unavailable at a given time for recovering data of a data stripe 138. For example, as will be described below with respect to FIGS. 2A and 3, in one embodiment, driver 126 may distribute a data stripe across multiple erase blocks such that enough portions of the data stripe (i.e., K or more portions) remain available to reassemble the data when an erase operation is performed to at least one of the erase blocks. In some embodiments, the data stripe may also be written across multiple pages (discussed below) so that data can still be recovered during a write operation to one of the pages as well as multiple dies 136 so that data can be recovered when one of the dies 136 is already servicing a read request for other data.

In some embodiments, driver 126 also selects storage elements for striping data in order to maximize channel bandwidth. As noted above, storage elements may be accessible via separate channels. As will be described below with respect to FIGS. 2A and 3, in one embodiment, each pad 134 may be accessible via a respective channel. In such an embodiment, driver 126 may stripe data across storage elements associated with distinct channels (e.g., storage elements in separate pads 134) so that data from the stripe can be accessed in parallel via each channel. This stands in contrast to writing data to storage elements associated with the same channel, which, in some embodiments, may necessitate performing multiple sequential read operations to read each portion.

In some embodiments, driver 126 further improves access latencies by scheduling storage operations based on the latencies of the operations and the current availability of storage elements. In one embodiment, driver 126 may restrict the number of higher latency operations (e.g., write operations and erase operations) performed in a given interval to N−K operation in order to leave at least K storage elements available to reassemble data of a data stripe. Thus, if N−K operations are already being performed (i.e., N−K storages elements are busy performing operations), driver 126 may delay servicing a subsequent request to write or erase data in one of the N storage elements until another storage element becomes available. In some embodiments, driver 126 may also prioritize lower latency operations (e.g., read operations) over higher latency operations. For example, if driver 126 simultaneously receives a request to write data and another request to read data at the same location, in some instances, driver 126 may delay the write operation until the read operation has completed. In other instances, however, if there are sufficient storage elements available (i.e., at least K+1 storage elements), driver 126 may perform the write operation while servicing the read operation by reconstructing the requested data.

In some embodiments, driver 136 may also schedule write operations and erase operations such that a number of busy channels does not exceed N−K for a given data stripe so that the remaining portions of the data stripe can be read in parallel over each available channel. In some embodiments, driver 126 may also schedule operations based on a determined quality of service (QoS) to be provided. For example, in one embodiment, a given application 122 may need to have a particular amount of write bandwidth available in order for it to function properly. In some embodiments, driver 126 may determine that the application 122 has this particular QoS need based on a user's input or an input provided by application 122. Accordingly, in such an embodiment, driver 126 may schedule storage operations (e.g., write operations and/or erase operations) in an effort to ensure that the application 122 has the desired write bandwidth. In some instances, scheduling storage operations may include delaying other storage operations (e.g., read operations and/or erase operations) if executing those operations would result in storage device 130 not being able to provide the particular write bandwidth. In other words, if a particular erase operation could result in the blocking of a write operation that would violate the write bandwidth level, storage device 130 may delay the erase operation. For example, driver 126 might delay reassembling data as reassembling data consumes available bandwidth by increasing the number of performed read operations. In other embodiments, applications 122 may have different QoS criteria, and driver 126 may schedule storage operations accordingly.

Figure 2A:
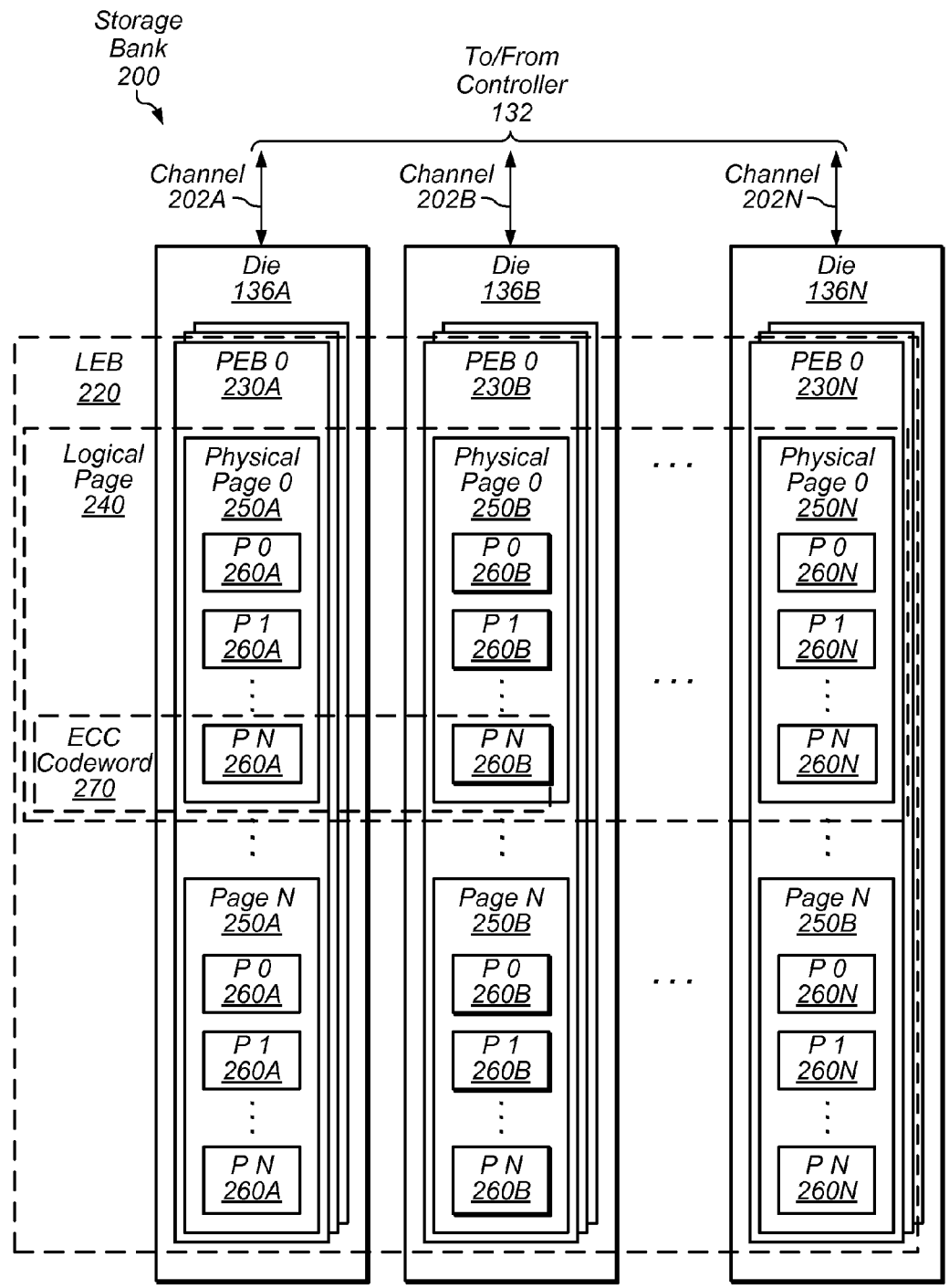
FIGS. 2A and 2B are block diagrams illustrating embodiments of components within a storage device of the computing system.

Turning now to FIG. 2A, a block diagram of storage elements within storage device 130 is depicted. As noted above, in some embodiments, dies 136 residing in separate pads 134 are grouped into storage banks such as storage bank 200. In the illustrated embodiment, a storage bank 200 is organized into logical erase blocks (LEBs) 220 that include multiple physical erase blocks (PEBs) 230, which are located in separate dies 136. A logical erase block 220 is further divided into multiple logical pages 240 that, in turn, include multiple physical pages 250. Physical pages 250 include multiple packets 260, which may be grouped into error correcting code (ECC) codewords 270.

As used herein, the term "erase block" refers broadly to a logical erase block or a physical erase block. In one embodiment, a physical erase block 230 represents the smallest storage block with a die 136 that can be erased at a given time (e.g., due to the wiring of cells on the die). In one embodiment, logical erase blocks 220 represent the smallest block erasable in a bank 200 by controller 132 in response to receiving an erase command. In such an embodiment, when controller 132 receives an erase command specifying a particular logical erase block 220, controller 132 may erase each physical erase block 230 within the logical erase block 220 simultaneously. (As used herein, the term "simultaneously" (as well as the phrase "in-parallel") refers to two or more operations that overlap for at least a portion in time. Accordingly, operations that begin and/or end at different times are still performed simultaneously if they overlap for at least some portion of time.)

In one embodiment, a physical page 250 represents the smallest storage block within a given storage bank 200 that can be written to at a given time. In one embodiment, a logical page 240 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 240 across multiple dies 136 may result in faster access times for a set of data when multiple dies 206 are accessed in parallel. Although a logical page 240 is shown as including physical pages 250 within the same bank 200 in the illustrated embodiment, a logical page 240 may include physical pages 250 located within separate logical erase blocks 220 and even separate banks 200 in other embodiments such as those discussed below with respect to FIG. 3. For example, as will be described below, a logical page 240 may be written "diagonally" across multiple banks 200 in some embodiments.

In one embodiment, a packet 260 represents the smallest storage block within a given storage bank 200 that can be read at a given time. In one embodiment, an ECC codeword 270 is the smallest storage block readable by controller 132. In some embodiments, packets 260 may be slightly larger than logical blocks 210 as they may include the contents of a logical block 210 (or multiple blocks 210 in some instances) as well as a packet header.

In the illustrated embodiment, each die 136 is accessible via a respective one of channels 202A-N such that packets 260 may be accessible concurrently. For example, storage device 130 may read packet P0 260A and P0 260B in parallel via channels 202A and 202B, respectively. In some embodiments, however, reading two packets from the same die 136 (e.g., packets P0 260A and P1 260A) may necessitate performing successive read operations. (In other embodiments, a given channel 202 may support multiple reads from the same die 136 in parallel.) In some embodiments, as noted above, dies 136 within a given pad 134 may share a channel 202—e.g., die 136A may share channel 202A with the other dies 136 on the pad 134 that includes die 136A. In other embodiments, channels 202 may be arranged differently.

Figure 2B:
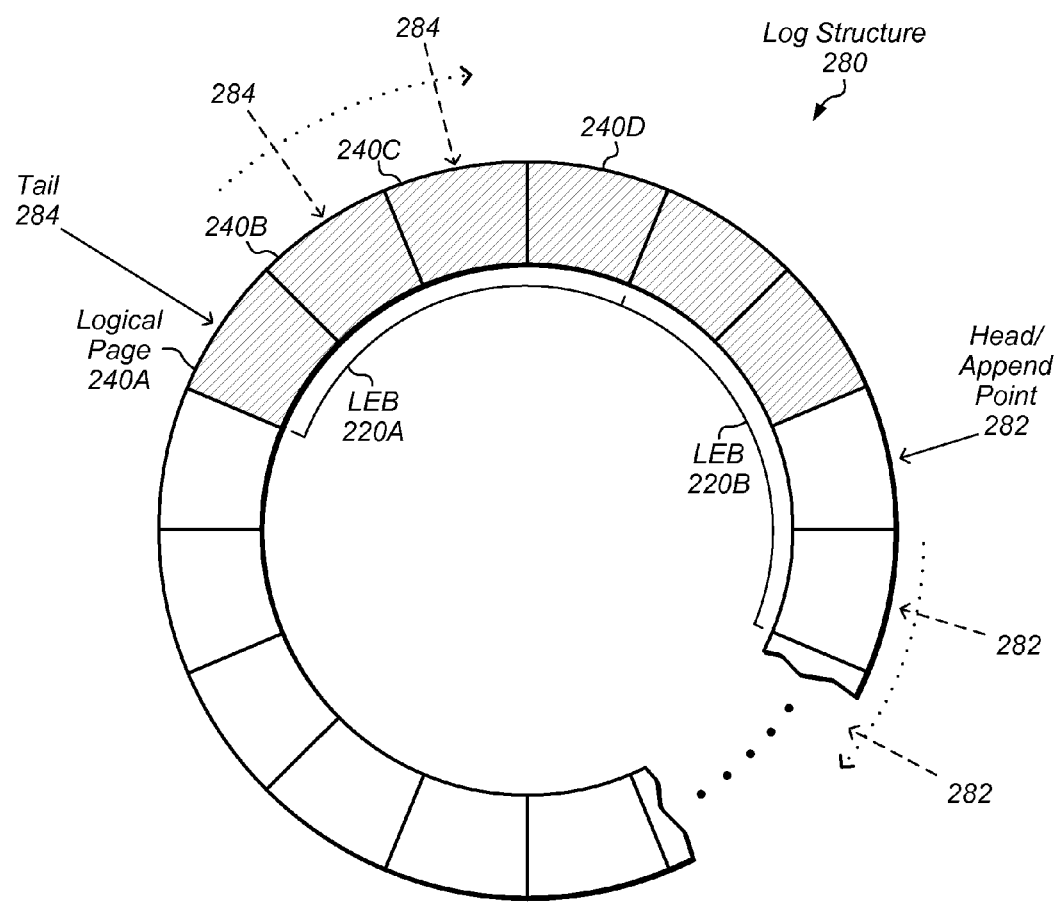

Turning now to FIG. 2B, a block diagram of log structure 280 representing a layout of data on storage device 130 is depicted. As shown, in various embodiments, data is stored sequentially at an append point 282 (also referred to as the "head") that starts at an initial logical page 240—e.g., page 240A. As additional data is stored, append point 282 advances to subsequent logical pages 240 in log structure 280—e.g., page 240B, 240C, and so on. (The term "adjacent" may be used to describe storage blocks that are written one after the other in sequential order. For example, as shown, logical page 240A is adjacent to logical page 240B; LEB 220A is adjacent to LEB 220B.) Eventually, after storing enough data, the append point 282 reaches the "last" page 240 in storage device 130, at which point the append point 282 wraps back to the initial logical page 240. Thus, log structure 280 is depicted as a loop/cycle. As more data is stored, the number of available logical pages 240 (shown as unshaded pages 240) decreases and the number of used logical pages 240 (shown as shaded pages 240) increases. As discussed above, in order to reuse these logical pages 240 (i.e., make them available to receive further writes), in one embodiment, driver 126 performs erase operations on logical erase blocks 220. In one embodiment, a tail 284 is maintained to identify the oldest logical page 240 still in use within structure 280 (pages other than the one located at the tail are considered to be younger than the tail). When the logical erase block 220 with the oldest logical page 240 is eventually erased, tail 284 is advanced forward to the next oldest logical page 240 in use at the end of log structure 280.

In general, data that is modified less frequently than other data in storage device 130 will migrate towards tail 284 (such data may be described as having a "colder temperature" or simply as "cold data"). On the other hand, data that is modified more frequently (described as having a "hotter temperature" or as "hot" data) will typically be located closer to head 282. Thus, valid data located in LEB 220A is likely "colder" than data in LEB 220B.

In embodiments in which multiple storage devices 130 are used, each storage device 130 may be implemented as a separate respective log structure. Accordingly, in one embodiment, each storage layer 220 may track an append point for its respective storage device 130. Thus, when a write is performed access multiple storage devices 130, each portion of data may written to a respective one of the append points of the storage devices 130. Said differently, a portion of data may be written to append point 282 for a first storage device 130, a portion of data may be written to an append point 282 for a second storage device 130, and so on. In other embodiments, however, storage devices 130 may be organized in a non-log-structured format.

Figure 3:
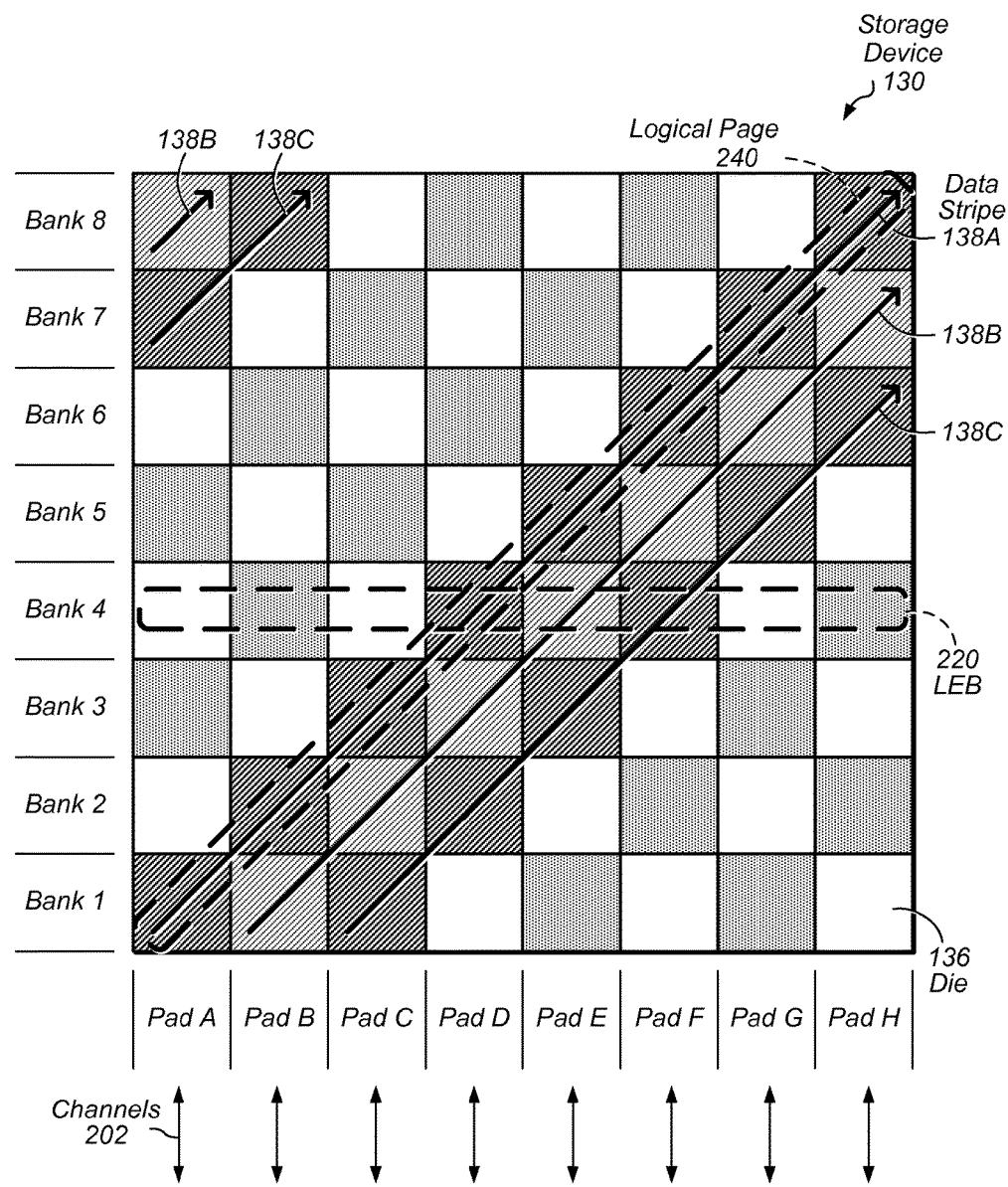
FIG. 3 is a block diagram illustrating one embodiment of diagonal data stripes written to the storage device.

Turning now to FIG. 3, a block diagram of diagonal data striping is depicted. As discussed above, in some embodiments, driver 126 may select storage elements for striping data in order to minimize unavailable storage elements and to maximize channel usage. In the illustrated embodiment, driver 126 writes data stripes 138A-C diagonally to achieve both of these goals.

As shown, in some embodiments, dies 136 within storage device 130 may be arranged into a grid having rows and columns. In the illustrated embodiment, the rows are dies 136 that reside within the same bank (corresponding to a bank 200 discussed above); the columns are dies 136 that reside within the same pad (corresponding to pad 134 discussed above). In such an embodiment, data stripes 138 A-C may then be written across a set of dies 136 in the diagonal such that each die 136 stores a portion of the data stripe 138 and/or recovery metadata of the data stripe 138. When a data stripe 138 reaches an edge of the grid, the data stripe 138 may be wrapped around as shown with data stripes 138B and 138C. As noted above, to facilitate writing data stripes 138 diagonally, in some embodiments, logical pages 240 may include physical pages 250 (discussed above with respect to FIG. 2A) arranged diagonally across banks 1-8. For example, in the illustrated embodiment, data stripe 138A is shown as being written to a logical page 240. In some embodiments, a given data stripe 138 may span more than one logical page 240, however.

As discussed above with respect to FIG. 2A, a given bank may include multiple logical erase blocks (LEBs) 220. For example, as shown in FIG. 3, bank 4 includes a LEB 220. When an erase operation is performed for the LEB 220 in bank 4, in one embodiment, dies 136 within bank 4 become unavailable (or at least portions of the dies 136 become unavailable). If a request is received to read the portion of data stripe 138A within bank 4 and pad D while LEB 220 is being erased, in one embodiment, driver 126 may read the remaining portions residing in banks 1-3 and 5-8 in order to reconstruct the data in bank 4. While this results in multiple reads being issued to the remaining banks, in the illustrated embodiment, the reads can be performed in parallel using the respective channels 202 of pads A-C and E-F. (While LEB 220 is shown in FIG. 3 as residing in the diagonal, it is noted that, in other embodiments, LEBs 220 may have a different orientation than shown. That is, LEBs 220 may include PEBs 230 residing in separate banks 200. Accordingly, in some embodiments, LEBs 220 may reside in the diagonal direction, in the vertical direction, or even in a non-linear manner.)

By writing each portion of a data stripe 138 to a different row (i.e., a different bank in the illustrated embodiment), driver 126 is able to minimize the number of storage elements (i.e., dies 136 in the illustrated embodiment) that become unavailable for data stripes 138 A-C when an erase operation is performed such as the erase of LEB 220 in bank 4. By writing each portion to a different column (i.e., a different pad in the illustrated embodiment), driver 126 is able to maximize channel bandwidth as each of the remaining portions of a data strip 138 can be written to and read from in parallel via each channel 202 (e.g., reading from Pads A-C and E-H in parallel). The data stripes 138A-C are thus described as diagonal as they are written to different rows and different columns. It is noted, however, that data stripes 138 may be written to each row and each column to achieve both goals without the data stripe being a diagonal line. Still further, in various embodiments, storage device 130 may include more (or less) banks and/or pads. Thus, while FIG. 3 depicts storage device 130 arranged as an N×N grid, storage device 130, in other embodiments, may be arranged as an M×N grid, for example.

In some embodiments, driver 126 may use an additional map data structure to determine physical addresses for a diagonal data stripe such as shown in FIG. 3. That is, as discussed above, driver 126 may receive requests to write data that specify one or more logical addresses. In such an embodiment, driver 126 may use a first map data structure to translate the logical addresses to an initial set of corresponding physical addresses in storage device 130. Driver 126 may then use a second map data structure to translate the initial set of physical addresses to a second set of physical addresses that are in the diagonal. For example, when writing data stripe 138A, in one embodiment, the output of the first data structure may be physical addresses in bank 1; the second data structure may then translate these addresses to physical addresses in banks 1-8. In some embodiments, this second data structure may be implemented using a lookup table. In another embodiment, driver 126 may apply a formula to determine the correct physical addresses for a data stripe 138 (e.g., incrementing the bank address for each column increase).

Figure 4:
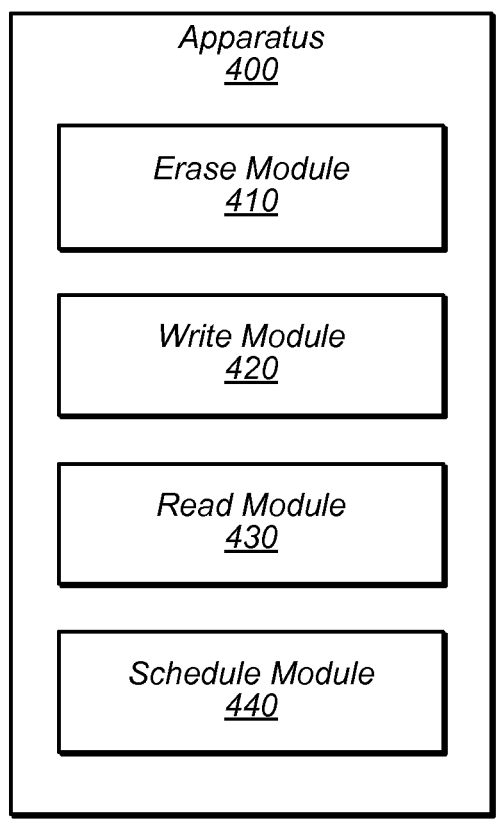
FIG. 4 is a block diagram illustrating one embodiment of an apparatus that includes modules.

Turning now to FIG. 4, a block diagram of an apparatus 400 including modules is depicted. As used herein, the term "module" refers to circuitry configured to perform operations or a memory having program instructions stored therein that are executable by one or more processors to perform operations. Accordingly, a module may be implemented as a hardware circuit in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 400 may include modules to implement any of the functionality described herein. For example, in the illustrated embodiment, apparatus 400 includes an erase module 410, a write module 420, a read module 430, and a schedule module 440. In other embodiments, apparatus 400 may include more or less modules than shown.

Erase module 410, in one embodiment, is configured to simultaneously erase a plurality of physical erase blocks (e.g., PEBs 230 corresponding to a LEB 220) in a bank (e.g., a bank 200) of a storage device. In such an embodiment, ones of the plurality of physical erase blocks are associated with different respective communication channels (e.g., channels 202). In some embodiments, the plurality of physical erase blocks are contained within dies (e.g., dies 136) that are arranged into pads (e.g., pads 134), wherein each pad is accessible via a respective one of the communication channels.

Write module 420, in one embodiment, is configured to write a data stripe across a set of physical erase blocks such that the set of physical erase blocks includes physical erase blocks of different banks (e.g., banks 1-8 depicted in FIG. 3) and includes physical erase blocks associated with different communication channels. In various embodiments, the write module is configured to implement a K-of-N writing scheme, where N is a total number of physical erase blocks in the set of physical erase blocks, K is a number of physical erase blocks that store data of the data stripe, and N minus K (N−K) is a number of physical erase blocks that store parity information of the data stripe. In some embodiments, N−K is two or more physical erase blocks.

Read module 430, in one embodiment, is configured to determine, in response to a request for a portion of the data stripe, that one of the set of physical erase blocks is unavailable to service the request. In such an embodiment, the read module 430 is further configured to service the request by reassembling data of the unavailable physical erase block. In various embodiments, determining that the physical erase block is unavailable includes determining that the physical erase block is occupied servicing a write operation or an erase operation.

Schedule module 440, in one embodiment, is configured to track a number of write operations and a number of erase operations performed with respect to the set of physical erase blocks. In such an embodiment, schedule module 440 is further configured to schedule read operations, write operations, and erase operations such that the number of erase operations and the number of write operations collectively do not exceed N−K for the set of physical erase blocks within an interval. In some embodiments, schedule module 440 is configured to determine a quality of service to be provided for the storage device (e.g., a particular read bandwidth, write bandwidth, read latency, write latency, etc.), and to schedule read operations, write operations, and erase operations to achieve the quality of service.

In some embodiments, erase module 410, write module 420, read module 430 and/or schedule module 440 are within a controller such as controller 132. In another embodiment, one or more of modules 410-440 may be located within a memory such as memory 120. In sum, the modules of apparatus 400 may be implemented in any suitable manner to perform functionality described herein. Apparatus 400 may also correspond to any suitable structure having the functionality of modules 410-440. In one embodiment, apparatus 400 is a computing system that includes (or is coupled to) a storage device such as storage device 130. In another embodiment, apparatus 400 is a card including a controller (such as controller 132) and one or more storage elements (such as dies 136). In yet another embodiment, apparatus 400 is a computing system including a memory system that stores one or more of modules 410 and 440.

Figure 5:
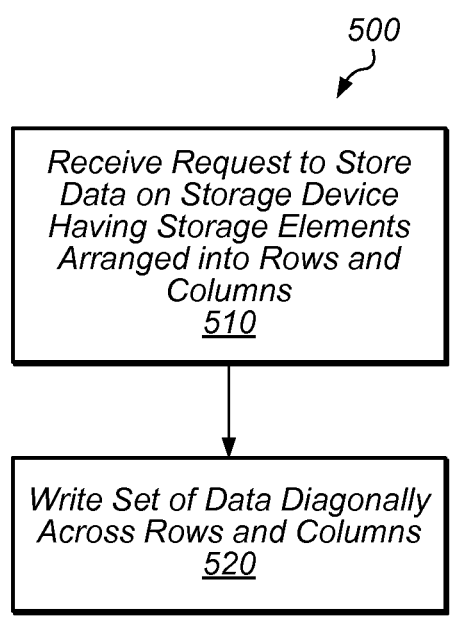
FIG. 5 is a flow diagram illustrating one embodiment of a method.

Turning now to FIG. 5, a flow diagram of a method 500 is depicted. Method 500 is one embodiment of a method that may be performed by an apparatus such as computing system 100 or storage device 130. Accordingly, in one embodiment, the apparatus may execute program instructions of a driver such as driver 126 to perform method 500. In some embodiments, performance of method 500 may decrease a system's read latencies and reduce the number of instances in which a read operation blocks behind other operations.

In step 510, a request to store data on a storage device having storage elements arranged into rows and columns is received. In such an embodiment, the storage device may be configured to erase storage elements within a given row such that erasures of the storage elements overlap at least in part in time, and to access storage elements within separate columns in parallel. In one embodiment, the rows are banks (e.g., storage banks 200) and the columns are pads (e.g., pads 134). In some embodiments, the storage elements are physical erase blocks (e.g., PEBs 230) located on respective dies (e.g., dies 136). In one embodiment, each die is associated with a respective one of a plurality of communication channels (e.g., channels 202). In some embodiments, the number of the rows differs from the number of the columns.

In step 520, a set of data is written diagonally (e.g., as shown in FIG. 3) across a plurality of the rows and a plurality of the columns such that a portion of the set of data is recoverable when a storage element at one of the plurality of rows and one of the plurality of columns is inaccessible. In some embodiments, step 520 includes using a first map data structure to translate logical block addresses to corresponding physical block addresses, and using a second map data structure to translate the physical block addresses to addresses of storage elements located diagonally across the plurality of rows and the plurality of columns.

In various embodiments, method 500 furthers include receiving a request to read a portion of the set of data from an inaccessible storage element, determining that enough storage elements are accessible to reassemble the data, servicing the request with the reassembled data and without blocking the read. In some embodiments, the storage element is inaccessible because the storage element is being used to service another request to read data.

Figure 6:
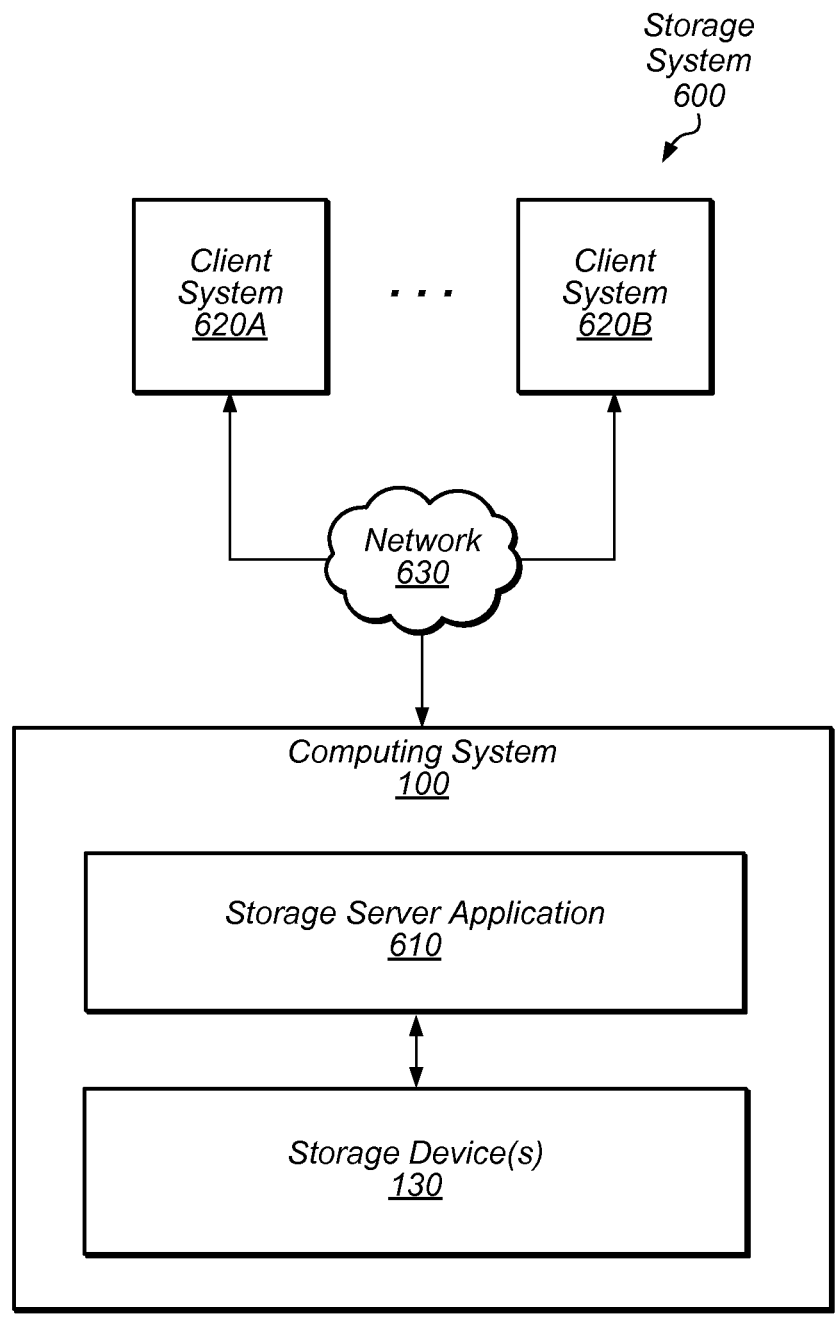
FIG. 6 is a block diagram illustrating one embodiment of a storage system including the computing system.

Turning now to FIG. 6, a block diagram of a storage system 600 including computing system 100 is depicted. As discussed above, computing system 100 may include one or more applications that operate on data stored in storage device 130. In the illustrated embodiment, computing system 100 executes a storage server application 610 to enable client systems 620A and 620B to access and store data in one or more storage devices 130 via network 630. For example, in one embodiment, storage system 600 may be associated with an enterprise environment in which server application 610 distributes enterprise data from storage device 130 to clients 620. In some embodiments, clients 620 may execute other server applications such as web servers, mail servers, virtual private network (VPN) servers, etc. to further distribute data to other computing systems. Accordingly, in some embodiments, storage server application 610 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program instructions. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may further be loaded onto a general purpose computer, special purpose computer, or other programmable data processing apparatus to cause the apparatus to perform a set of operations that implement one or more functions described herein.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. An apparatus, comprising:
   a controller; and
   a plurality of physical buses, each physical bus configured to communicatively couple circuitry of the controller to a respective memory die, the physical buses comprising a plurality of communication channels to physical erase blocks of the respective memory die;
   wherein the controller is configured to perform erase operations on physical erase blocks arranged into respective erase groups, the erase groups comprising respective sets of physical erase blocks communicatively coupled to the circuitry of the controller through different respective physical buses in parallel,
   wherein the controller is configured to perform write operations to store data stripes on physical erase blocks arranged into respective write groups, the write groups comprising respective sets of physical erase blocks communicatively coupled to the circuitry of the controller through different respective physical buses in parallel, a write group including a physical erase block included in one or more of the erase groups,
   wherein the erase groups comprise sets of physical erase blocks different from the sets of physical erase blocks comprising the write groups.

2. The apparatus of claim 1, wherein, in response to a request to read a portion of a data stripe stored in a write group, the controller is configured to determine that one of the physical erase blocks of the write group is unavailable to service the request, and to service the request by reassembling data of the unavailable physical erase block by use of data read from other physical erase blocks of the write group.

3. The apparatus of claim 2, wherein determining that the physical erase block is unavailable comprises determining that one or more of the physical erase block, a memory die comprising the physical erase block, and a pad comprising the memory die is occupied servicing one of a write operation and an erase operation.

4. The apparatus of claim 1, wherein the controller is configured to implement a K-of-N writing scheme,
   wherein N is a number of physical erase blocks in the write groups, wherein K is a number of physical erase blocks that store data of a data stripe, and wherein N minus K is a number of physical erase blocks in the write groups that store reconstruction metadata of the data stripe, and
   wherein the data stripe is distributed across physical erase blocks such that K or more physical erase blocks of the data stripe remain available when erase operations are performed on least one of the physical erase blocks.

5. The apparatus of claim 4, further comprising:
   a scheduler configured to:
   track a number of write operations and a number of erase operations performed with respect to the physical erase blocks; and
   schedule read operations, write operations, and erase operations of the controller such that a number of erase operations and a number of write operations on physical erase blocks of particular write groups do not exceed N minus K within an interval.

6. The apparatus of claim 5, wherein the scheduler is configured to determine a quality of service to be provided, and to schedule read operations, write operations, and erase operations on physical erase blocks of respective erase groups and write groups to achieve the determined quality of service.

7. The apparatus of claim 4, wherein N minus K is two or more physical erase blocks.

8. A storage device, comprising:
   a plurality of memory pads, each memory pad being communicatively coupled to a controller of the storage device through a respective physical bus, the memory pads comprising respective columns of a solid-state storage array, each column comprising a plurality of storage blocks,
   wherein the storage device is configured to reclaim storage blocks within respective banks of the solid-state storage array concurrently, the banks comprising respective bank groups comprising storage blocks accessible through different respective memory pads and within separate respective columns of the solid-state storage array,
   wherein the storage device is configured to write data stripes on the solid-state storage array, the data stripes mapping to respective stripe groups comprising storage blocks accessible through different respective memory pads and within separate respective columns of the solid-state storage array such that data stripes are written to storage blocks within a plurality of columns concurrently,
   wherein a storage block of a stripe group is included in one or more of the bank groups, and
   wherein the bank groups are different from the stripe groups.

9. The storage device of claim 8, wherein the banks correspond to rows of the solid-state storage array, and wherein the storage device writes data stripes diagonally within the solid-state storage array.

10. The storage device of claim 8, wherein the storage device is configured to:
    track storage blocks being accessed for read operations, write operations, and erase operations;
    determine that a particular storage block of a data stripe spanning a plurality of storage blocks is being accessed for one or more of a write operation and an erase operation; and
    reassemble data of the particular storage block from data of the data stripe read from storage blocks of the data stripe.

11. The storage device of claim 10, wherein the storage device is configured to delay one or more of a write operation or an erase operation in order to read data for reassembling the data of the particular storage block.

12. The storage device of claim 10, wherein the storage device is configured to reassemble the data of the particular storage block by performing an exclusive-OR operation between data of the data stripe and parity data of the data stripe.

13. The storage device of claim 8, wherein the storage device is configured to schedule write operations and erase operations such that a number of busy channels does not exceed a threshold and a number of busy storage blocks does not exceed a threshold.

14. The storage device of claim 8, wherein the data stripe is a data stripe in accordance with redundant array of independent disks (RAID) 5.

15. A method, comprising:
performing storage operations on storage elements arranged into an array comprising rows and columns, wherein each column of the array comprises a respective plurality of the storage elements and is communicatively coupled to a controller through a respective physical bus of a plurality of physical buses, wherein the rows of the array comprise storage elements of respective columns, and wherein performing the storage operations comprises:
erasing storage elements according to a row pattern within the array, wherein erasing a row according to the row pattern comprises erasing a plurality of storage elements in respective columns of the array, each storage element being erased in response to an erase command received through a respective physical bus; and
writing data sets according to a diagonal pattern within the array, wherein writing a data set according to the diagonal pattern comprises writing the data set on storage elements across a plurality of the rows and a plurality of the columns of the array, each column communicatively coupled to the controller through a respective physical bus of the plurality of physical buses of the array, the diagonal pattern different from the row pattern.

16. The method of claim 15, further comprising:
receiving a request to read a portion of a data set written according to the diagonal storage pattern, the portion stored on an inaccessible storage element within a particular column of the array;
reassembling the portion of the data set by use of data of the data set written to storage elements of columns of the array other than the particular column; and
servicing the request with the reassembled data and without blocking the request.

17. The method of claim 16, wherein the inaccessible storage element is inaccessible due to one or more of the inaccessible storage element being used to service another request to read data and a storage element of the particular column, different from the inaccessible storage element, being accessed.

18. The method of claim 15, wherein writing a data set according to the diagonal pattern comprises:
using a first map data structure to translate logical block addresses to corresponding physical block addresses; and
using a second map data structure to translate the physical block addresses to addresses of storage elements located diagonally across the plurality of rows and the plurality of columns.

19. The method of claim 15, wherein a number of the rows differs from a number of the columns.

20. The method of claim 15, wherein the storage elements are physical erase blocks located on respective dies, wherein each die is associated with a respective one of a plurality of communication channels.

* * * * *